United States Patent

Currier et al.

[15] 3,685,254
[45] Aug. 22, 1972

[54] MACHINE FOR AUTOMATICALLY FEEDING, COVER APPLYING, SEALING, AND TRIMMING, FILLED PACKAGES

[72] Inventors: Jonathan E. Currier, 14 Stockade Rd., West Simsbury, Conn. 08092; Donald B. Williams, 1459 Dunbar Hills Rd., Hamden, Conn. 06514

[22] Filed: Sept. 16, 1970

[21] Appl. No.: 72,686

[52] U.S. Cl. ..................................53/329, 53/373
[51] Int. Cl. ..............................................B65b 7/28
[58] Field of Search..................53/329, 282, 373, 184

[56] References Cited

UNITED STATES PATENTS

| | | | |
|---|---|---|---|
| 3,478,489 | 11/1969 | Meisner | 53/282 X |
| 3,112,590 | 12/1963 | O'Brien | 53/282 |
| 3,342,010 | 9/1967 | Henry | 53/282 X |
| 3,429,099 | 2/1969 | Sparks | 53/373 X |

*Primary Examiner*—Travis S. McGehee
*Attorney*—W. Lee Helms

[57] ABSTRACT

The machine receives open top filled packages (such as trays as one example) placed in side by side nests on an endless conveyor, means being operative to move the conveyor in alternate forward and rest movements, under the forward length of a cover sheet, such as sealing plastic, carried by a roll of the sheet. The nests with their packages are moved by the conveyor under a heated sealing plate, at which point the conveyor rests, and the sealing plate is driven downward into contact with the cover-sheet area above the packages, and the latter is sealed to the packages, as, for example, to the margins thereof. The sealing plate is then withdrawn upwardly and the packages given an upward movement and into contact with a hot wire cut-off which cuts the marginal edges of the sealed covers from the cover sheet. Then the packages are moved by the machine upwardly to a point above a series of delivery rollers, and pushing means move them so that then by gravity they leave the machine. The conveyor thus moves and rests repeatedly to act repeatedly on each side by side nest-held packages along the length of the conveyor, as to the machine elements thus specified.

3 Claims, 16 Drawing Figures

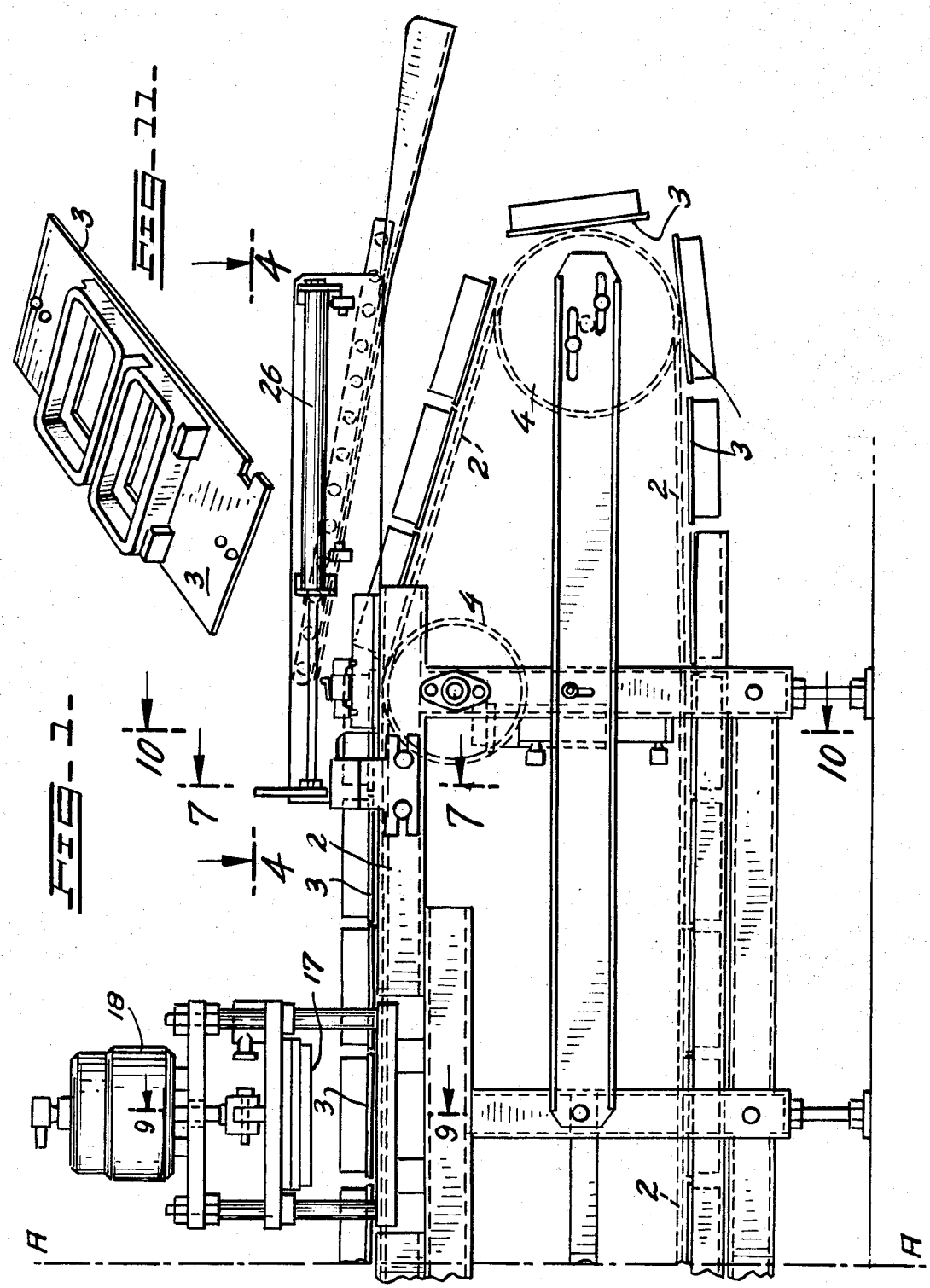

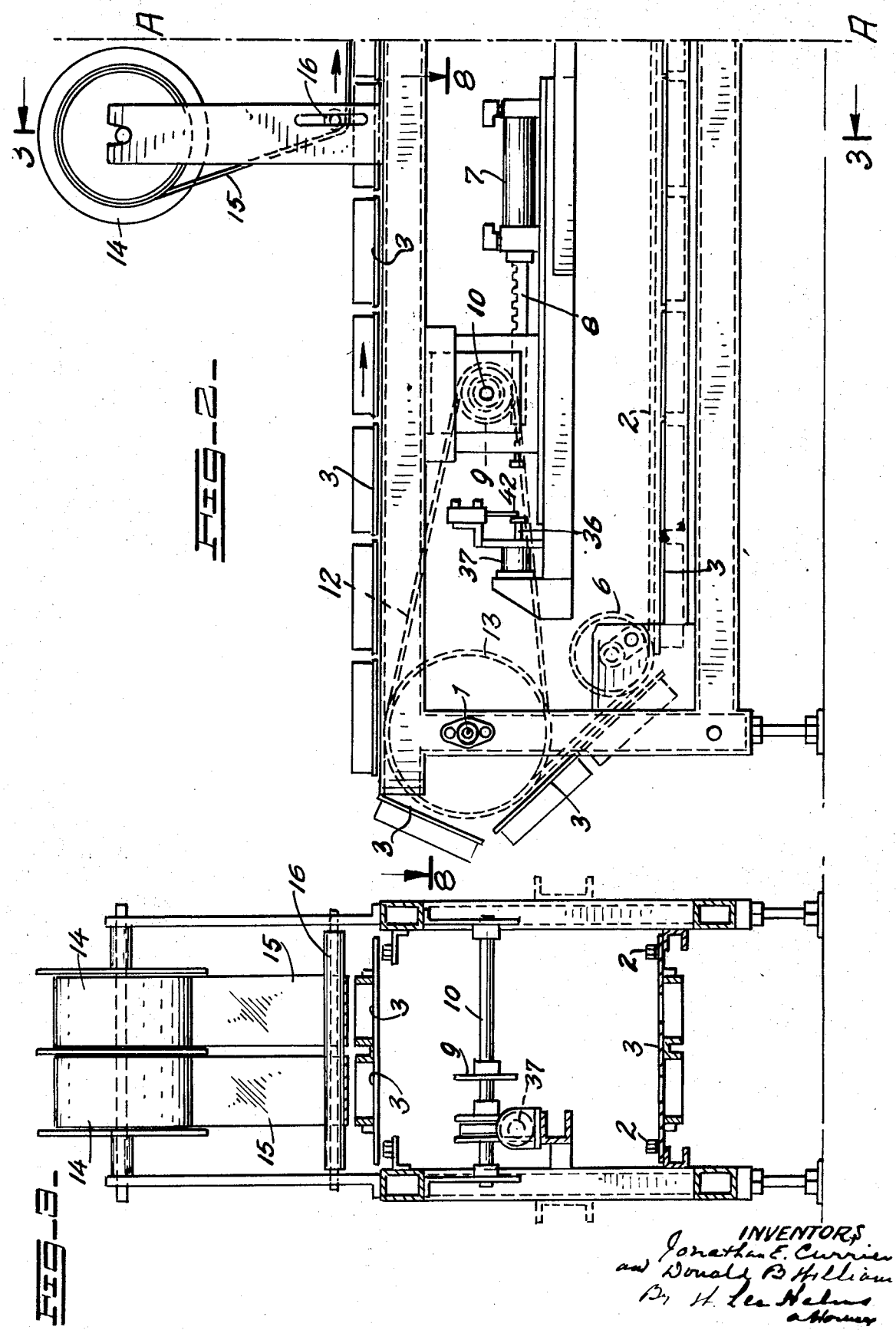

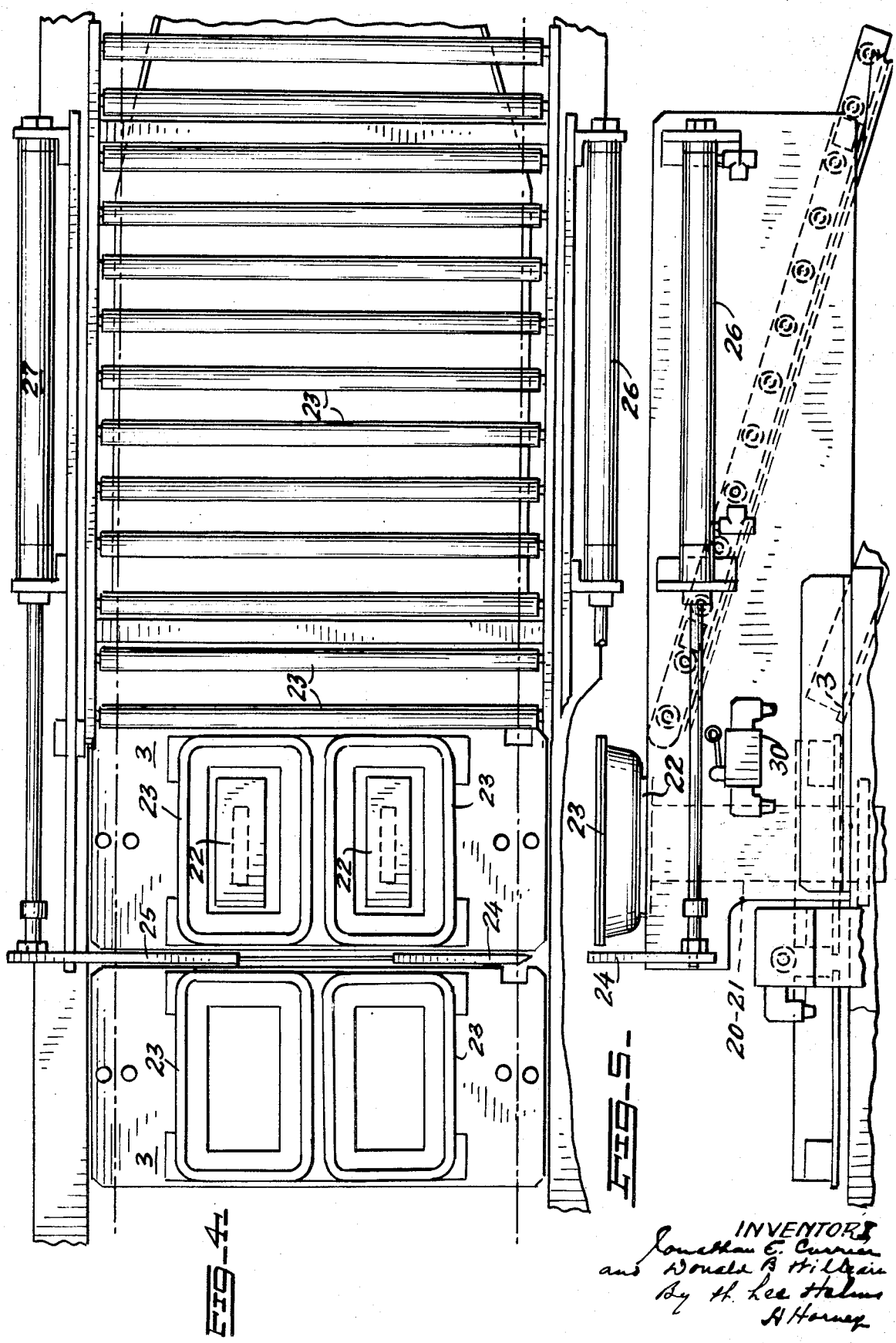

PATENTED AUG 22 1972
3,685,254
SHEET 4 OF 7
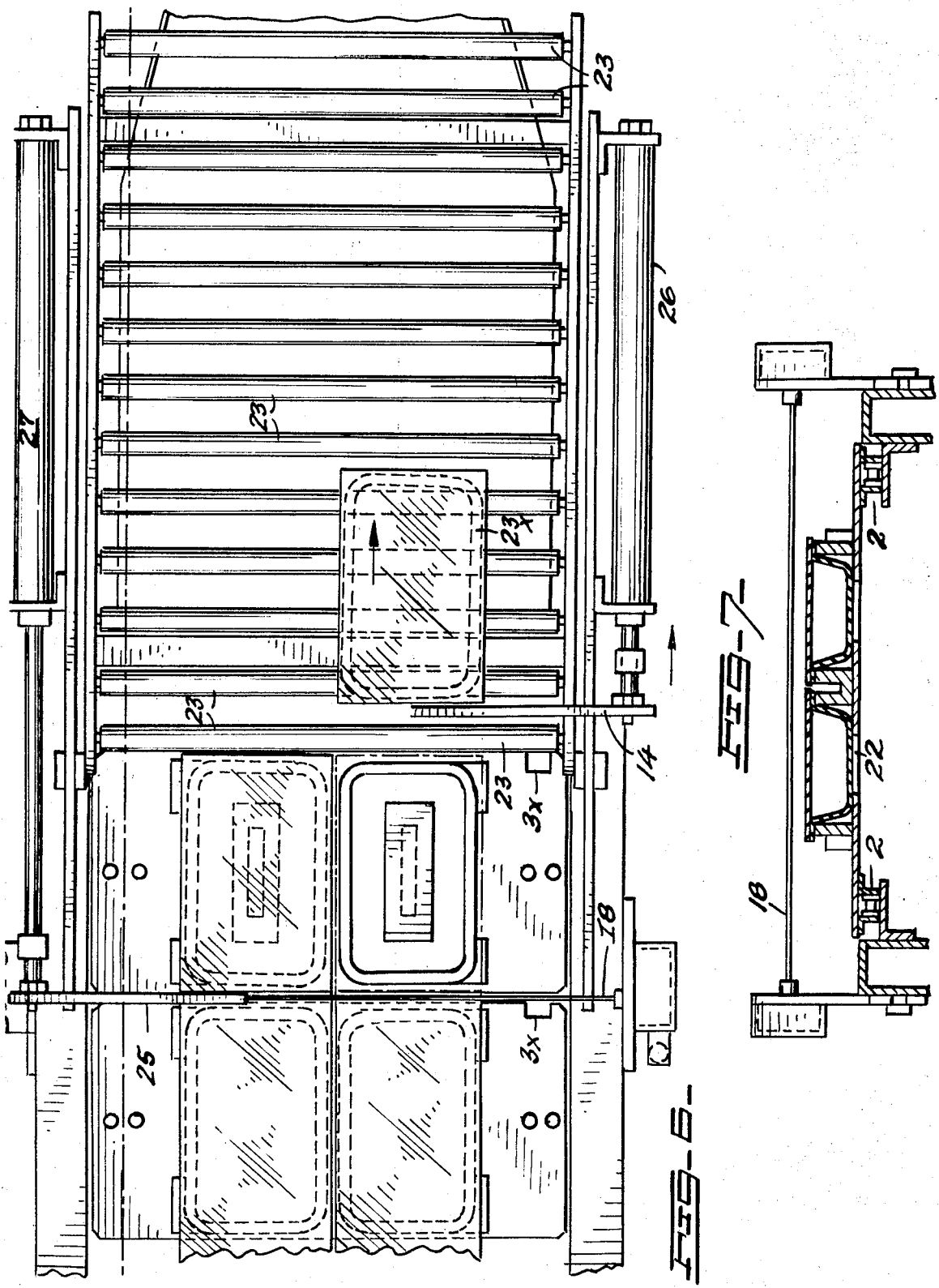
INVENTORS:
Jonathan E. Currier
and Donald B. Hillian
By H. Lee Helms
Attorney

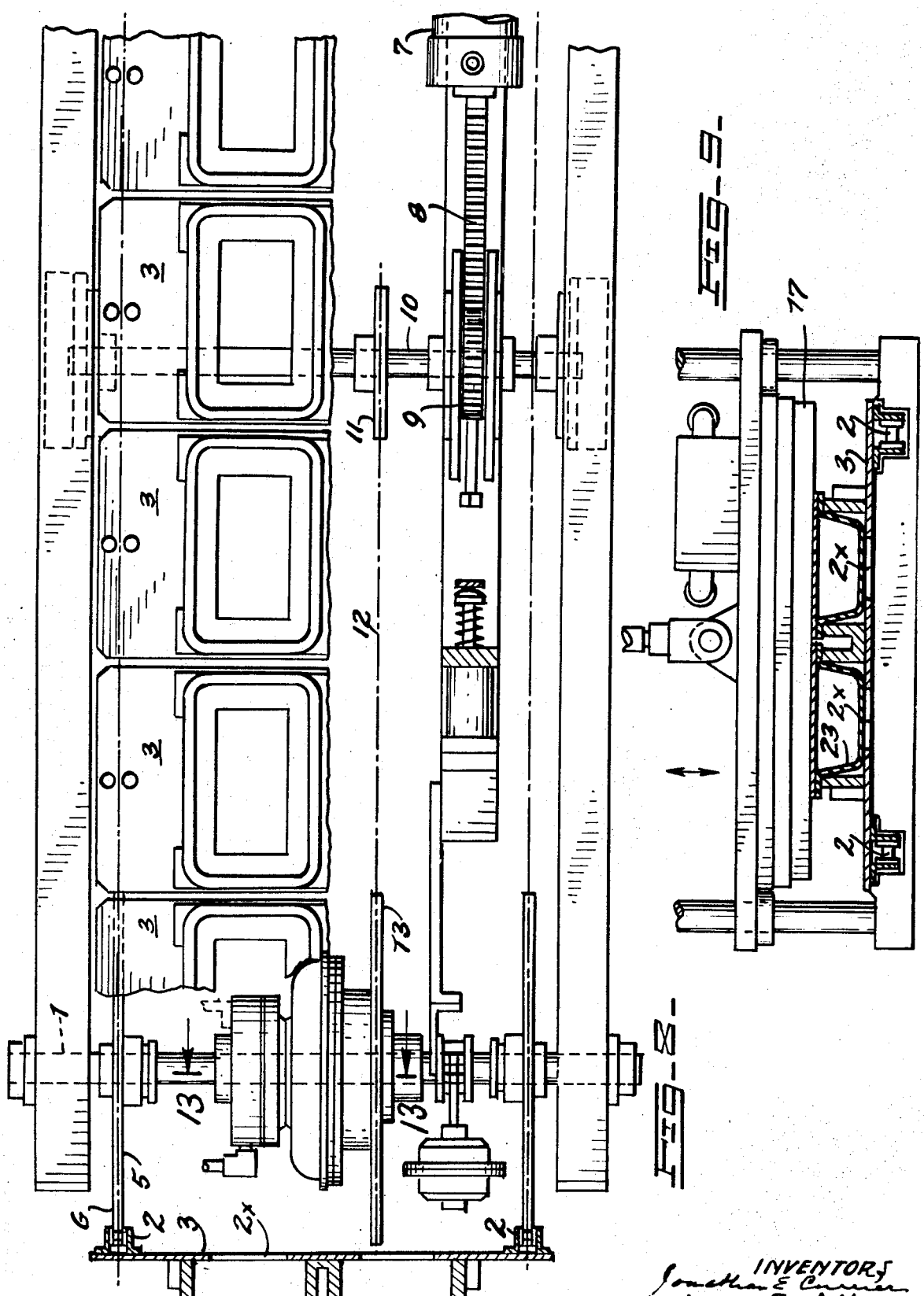

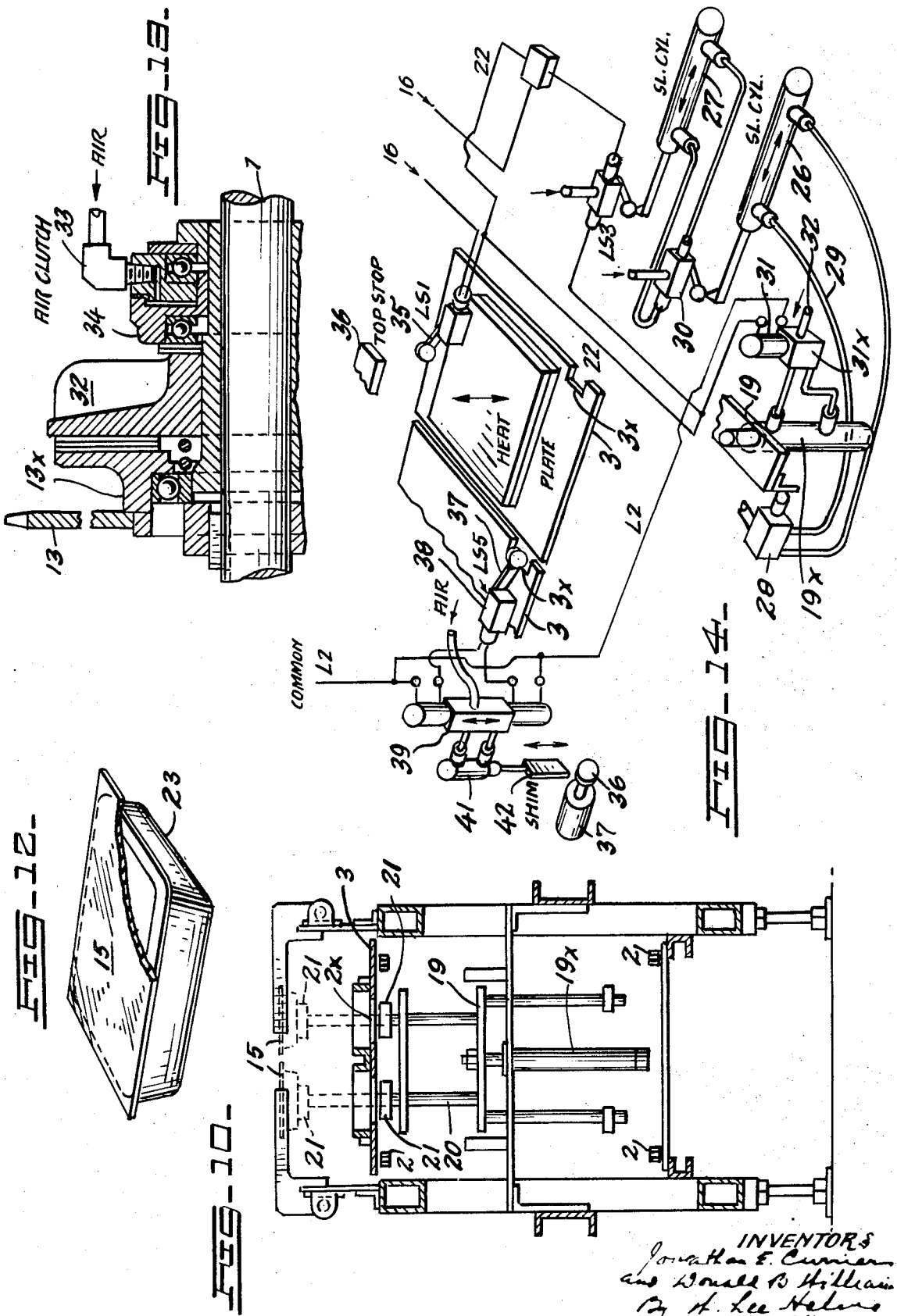

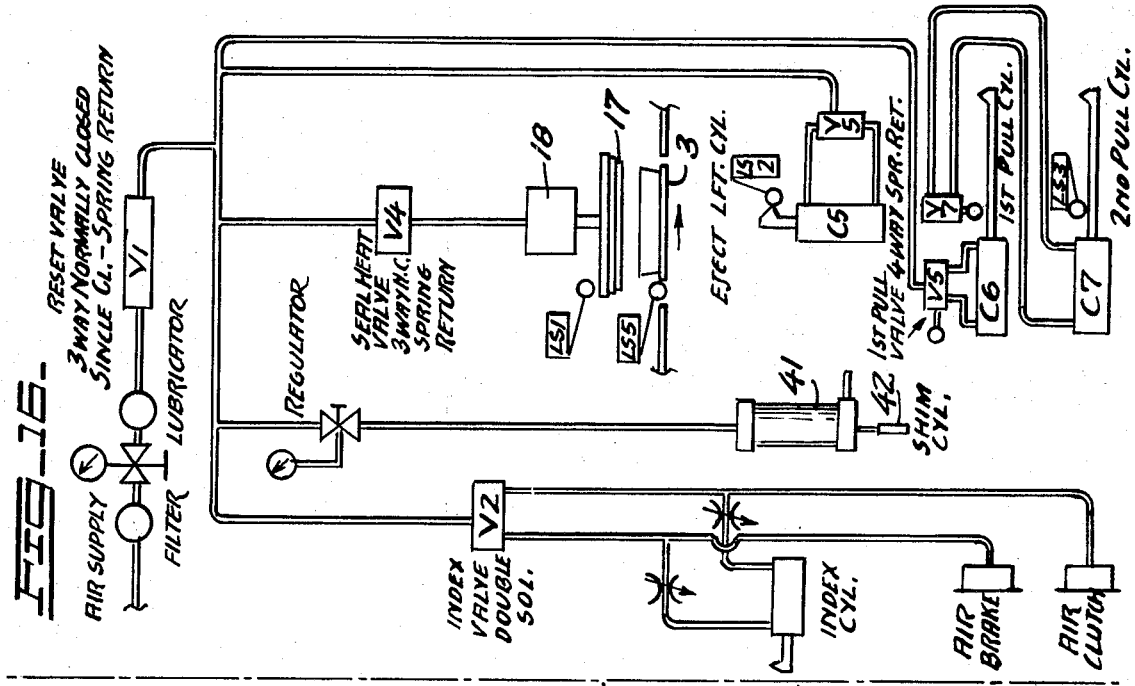
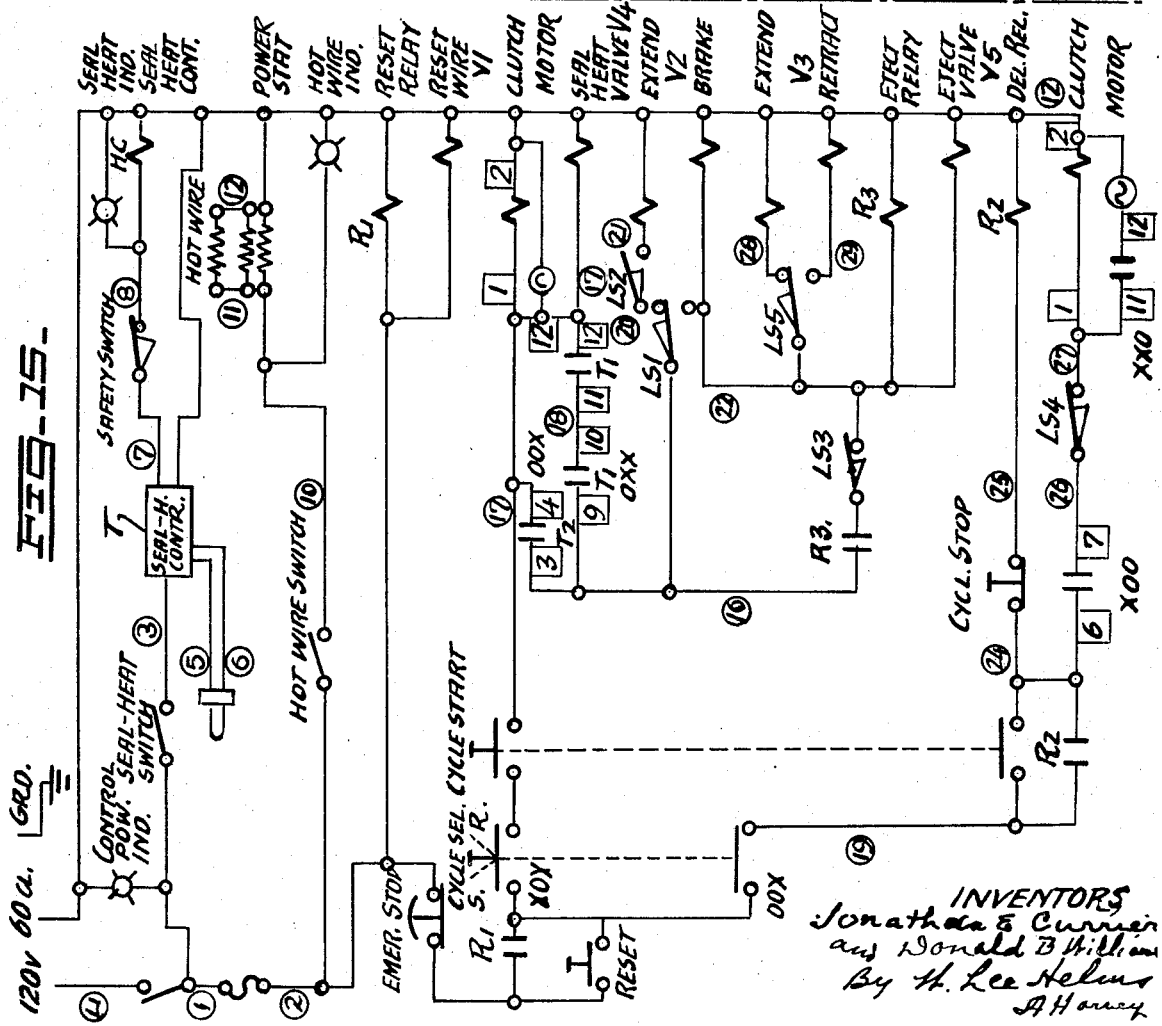

MACHINE FOR AUTOMATICALLY FEEDING, COVER APPLYING, SEALING, AND TRIMMING, FILLED PACKAGES

The invention will be described with reference to the accompanying drawings, in which:

FIG. 1 is a view in elevation of the rear half of the machine, being complementary to FIG. 2.

FIG. 2 is a view in elevation of the front half of the machine.

FIG. 3 is a vertical section, taken on the line 3—3, FIG. 2.

FIG. 4 is an enlarged top plan view of the rear and hence delivery area of the machine.

FIG. 5 is a view looking at the side of the elements shown in FIG. 4, certain elements being shown in dotted lines.

FIG. 6 is a plan view of the rear and hence delivery area of the machine looking down on the package pushing elements which act in succession, one having pushed a package onto the delivery rollers.

FIG. 7 is a fragmentary transverse elevation of the top area of the machine and through two side-by-side packages showing a single hot wire used when two rolls of cover sheets are used, thus rendering unnecessary crossed wires of which two would be used, one between side by side nests, the second being on the line 7—7, FIG. 1.

FIG. 8 is a broken-away top plan view, taken on the line 8—8, FIG. 2 and enlarged.

FIG. 9 Is a vertical section taken transversely of the upper part of the machine at the sealing hot plate, as to the feed belt members, two side-by said nests holding trays, and a cover pressed thereon by the hot plate, the remainder of the elements shown being in full lines, the section being taken on the line 9—9, FIG. 1.

FIG. 10 is a vertical section taken on the line 10—10, FIG. 1.

FIG. 11 (on the sheet showing FIG. 1) shows in perspective two of the nests side-by-side on a carrier plate which will be connected to the "belt" shown in the embodiment as two co-acting chain lengths.

FIG. 12 is a perspective view partly broken away showing a package with a trimmed (cut by hot wire) cover.

FIG. 13 is a fragmentary vertical section, taken on the line 13—13, FIG. 8, and showing the air-clutch for the conveyor sprocket shaft at the front of the machine.

FIG. 14 is a group view in perspective showing more particularly the elements and their connections of means for insuring "indexing" or registration of the packages with the heat plate and hot wire.

FIG. 15 is a disgram showing the feed and control elements of the machine and directed to both air power and electrical elements.

FIG. 16 is a diagram directed more particularly to air-power elements.

Referring to FIG. 1 of the drawings and FIG. 2 joined thereto at the line A—A, as the conveyor spaced chains, one being shown at numeral 1, move the plates 2 toward the rear of the machine and the nests carried thereby are so moved, the product filled packages are continuously placed in the nests as they are brought into position. The conveyor chains run over spaced rear sprockets 4 and spaced front sprockets 5 and 6, sprocket 5 being shown more specifically in FIG. 8. In the present embodiment the drive for the conveyor consists of an air cylinder 7 having a piston-carried rack 8 engaging a ratchet wheel or gear 9 on shaft 10. Shaft 10 carries a sprocket 11 connected by driven chain 12 to sprocket wheel 13 on shaft 1 the latter carrying, at the front of the machine, the conveyor chain sprockets 5, as aforesaid. Broadly speaking, as the air cylinder receives pressure, its piston-rack moves the conveyor rearwardly the required distance, and on return of the piston-rack, an idling return, the conveyor rests, so that there is a dwell for operations on the packages.

As the conveyor moves the package-received nests 3 under cover-sheet rolls 14, FIGS. 2 and 3, the cover sheets 15 are laid onto the tops of the packages by gravity roller 16 just ahead of the heat sealing plate 17, and when each pair of packages comes into registration with the plate the conveyor dwell occurs, whereupon the sealing plate actuator, which in the present embodiment is indicated as a diaphragm type air powered actuator 18, drives the sealing plate 17 downwardly into contact with the tops of the pair of packages as to the cover sheets lying thereon and the latter are hot-sealed to the tops of the packages, usually to the endges thereof or to flanges on the top edges of tray-like package members, and it will usually be desired that such edges be formed with minor flanges.

Simultaneously, or thereabouts, upon the down movement of the hot sealing plate, the rearward pair of cover sealed packages, theretofore sealed, are raised by the elements shown in FIG. 10 into engagement with a hot cut-off wire 18 indicated in FIGS. 6 and 7, so that said pair of trimmed sealed packages are ready for discharge. The said elements for raising said pair of packages, as shown in FIG. 10, consists in the present embodiment of an air power cylinder the piston of which carries a pusher-plate 19, engaging two push-rods 20, having heads 21 adapted to move through the apertures at 22 in the two conveyor plates 2 and thereby raise the said packages to the wire and sever their covered tops from the cover sheet forwardly thereof. Then said push-rods are continued in their upward movement to raise the sealed pair of packages just above the first of a series of delivery rollers 23 shown more particularly in FIGS. 4, 5 and 6, and rearwardly of a pair of ejector blades 24 and 25.

In the present embodiment two ejector blades for each pair of sealed packages are used because it is desired to eject one of the pair ahead of the other, since the machine packages very fast and the said arrangement enables use of one carton packer for the ejected packages when they are received by the packer one at a time. Also the ejected packages may more properly be received on a conveyor belt if that is to be used. Thus, referring to FIG. 6, ejector blade, carried by the piston rod of an air cylinder 26, ejects first, as shown in said Figure; and ejector blade 25 carried by the piston rod of an air cylinder 27 ejects immediately thereafter. Each ejection action moves a package on to the delivery rollers 23, which, being positioned in an angular line, enable swift descent of the sealed packages to the desired point of discharge.

The ejector operation is as follows:

Referring to FIG. 14, the forward pair of packages being positioned upwardly for reception on the discharge rollers, as the members 19, 20, are moved upward to carry a succeeding pair of packages to the hot wire cover-trim device, plate 19 (or any other moving part of the lift) releases the air-pressure valve 28 so that air pressure passes through pipe 29 to the piston of ejector cylinder 26 thereby carrying ejector blade 24 rearwardly for ejecting action on the adjacent package. In its active stroke, the piston rod of cylinder 26 releases air pressure valve 30, and air is fed to cylinder 27 the piston of which moves ejector blade 25 to eject the second package of the pair onto and down the discharge rollers.

The lift to the hot cover-trim device is controlled via the electrical lines by a solenoid 31 through an air pressure valve 31x leading to the cylinder 19x of the lift to the hot cover-trim device. Solenoid 31 is controlled (FIG. 14) by a switch LS1, operated by a switch arm 35. As the seal-covered packages reach top position said switch arm is engaged by a stop-actuator 36, and through wires (16) and L2 electric current is fed to valve 31x for descent of the lift.

The feed-regulating, and hence "indexing" of the chain driving rack 8 is controlled as follows:

In the successive movements of the nests with their packages to the "dwell" position under the hot sealing plate, it is arranged that they move a few thousands of an inch greater than the exact distance of their center points and that of the plate. This is effected, in part (FIGS. 2 and 14) by operation of an adjusting screw 36 against the air-moved feed rack 8. The feed rack comes into contact with the adjusting screw in its active stroke, controlling the length of that throw. The adjusting screw device is cushioned by being threaded into the piston of an air cylinder 37 having adequate air pressure. However other and automatic means for the purpose is shown, Thus each nest holding plate 3 is formed with a cut-out at 3x adapted to receive the head of a gravity switch arm 37 which controls a double-solenoid air-valve 39. According to the position of the switch arm 37 air pressure may be passed from pipe 40 to the piston head of an air cylinder 41, above or below the head, to drive a shim downwardly or upwardly. The shim 42 by its downward movement shortens the feed stroke of rack 8. It will be understood that with respect to the said elements the drawings are somewhat schematic, and the automatic shim control can be effected by means acting when the feed stroke of the rack is beyond desired length by a switch element on the rack itself, or engaged by a finger on the rack, and leading to the shim operating electrical controls, for example. Also the control may be effected by electrical sensing means of known construction.

Referring to FIG. 13, a friction air-clutch brake is provided for the chain moved nest holding plates 3. Thus shaft 1. having sprocket wheel 13 keyed thereto (FIG. 1), carries a slidable annular brake member 32,34 (FIGS. 8 and 13) having a friction face adapted to engage the like face of an annular member 13x keyed to the shaft and hence rotating with sprocket 13. When air pressure is passed through duct 33, the annular brake member 32 is moved into engagement with member 13x effecting clutch-brake action.

FIG. 15 diagrams the electrical wiring and controls and FIG. 16 diagrams the air pressure controls, for the machine. Although in the present embodiment the mechanical elements are driven by air pressure, it will be seen that they may be driven by electrical motor-power means and associated elements without material change in the electrical lines shown with the controls or equivalents thereof. However, when the materials packaged are frozen foods, for example, and hence the machine is located at a refrigeration plant for the foods, air power is present and is available and desirably operative for the machine, hence the air-power means shown herein.

Referring to FIGS. 15 and 16, also with reference to FIG. 14) a description of the operation sequences is as follows:

First connect air supply (desirable at 120 p.si — 5 h.p. Connect power ( desirable at 120/240 v. Set controls, timer $\boxed{1}$ — 1 ¼ sec. and timer $\boxed{2}$ —2 sec. Then set hot plate heat — 330° F., and hot trim wire—dull red glow.

Turn cycle control switch to "S", meaning "single", and manually adavnce conveyor until the hot wire is centered between nests, Then press "Reset" button and press "Emergency stop" button and again press "Reset" button after nests are properly centered with respect to the hot wire. Place a supply roll of cover-seal material on pay-off stand and start end of material through the machine to the hot wire area and under sealing plate. Place package filled trays into nests at front loading area of the machine; and then press "Cycle Start" button.

The action is as follows: The clutch is engaged through contacts TI 9–10 and 11–12 until TI cuts out. The valve for the sealing hot plate (V4. FIG. 16, is opened until the plate engages the cover material and the latter is sealed to the package, it being preferred that the latter consist of a marginally flanged tray containing the product packaged.

As the sealing plate leaves its top position, Limit Switch LS1 is shifted to connect the "Retract" solenoid if the Index Valve V2 causing the air brake to be applied and the Index Cylinder C2 to retract, the conveyor being held in a position of dwell. Also at this point the Index Sensor Switch LS5 will connect the air valve for the shim for interposing or withdrawing. The Eject Relay (R3) will close and hold through contacts R3/1 and the Eject Valve V5 will be shifted to cause Eject Lift Cylinder C5 with its piston to move a pair of previously sealed packages to and past the hot trim wire to a position for discharge of the said packages, whereupon the package ejector blades are successively operated. It is to be noted that the aforesaid movements are simultaneously instituted.

As C5 extends, LS2 is opened to prevent Index until C5 has reached full retraction, and when this occurs LS2 is closed.

When Cycle Selector is set at "Repeat", the following will occur: The Delay Relay R2 closes when Cycle Start is pressed and holds through R2/1. T1 has been reset and, through contacts T1 6–7, T2 will will start as LS4 closes. The machine will stay at rest until T2 times out, whereupon contacts T2 3–4 close, starting T1 for another cycle. As T1 starts, contacts T1 6–7 open to reset T2. For additional means for operating the rack adjusting shim, the latter can be interposed on "signal" from the Index Sensor Switch LS5 which may be located near the Sealing Head, i.e. the hot plate area, and as over-travel of the rack accumulates beyond allowable limits LS may "signal" the shim valve 39, FIG. 14 to interpose the shim. When the rack stroke is again within limits LS5 may be caused to "signal" withdrawal of the shim.

Having described our invention, what we claim and desire to secure by Letters Patent, is as follows:

1. In a machine for automatically feeding, cover applying, sealing, and trimming, filled packages, and which comprises an endless conveyor assembly, means for moving the conveyor in repeated active movements with dwell periods, means for receiving and supporting a cover sheet of heat-sealing character above the conveyor, and a plurality of bottom-apertured package holders equally spaced throughout and supported by the conveyor, of a frame for the aforesaid elements, in combination with a reciprocal hot-sealing plate carried by and above said frame, means for timed reciprocation of said plate in down and upward movements, vertically movable headed push-rod means carried by the frame under and operated after the hot-sealing plate and means for moving the same through the apertured package holders, brought by the conveyor into register therewith, and thereby to carry packages in said holders, with said cover sheet above them, to a raised position, and hot-wire severing means for said cover sheet operative to sever said cover sheet in said raising action of the push-rod means, and thereby freeing the main body of the cover sheet from packages acted upon by said hot-sealing plate.

2. A machine for automatically feeding, cover-applying, sealing, and trimming, filled packages, constructed in accordance with claim 1, in which the means for moving the conveyor comprises a reciprocatory drive member having drive action on the conveyor by active movement in one direction, and means for adjusting the length of said active movement consisting of a device movable into limiting stop action for said drive action when said active movement reaches a predetermined degree.

3. A machine for automatically feeding, cover-applying, sealing, and trimming, filled packages, constructed in accordance with claim 1, in which the conveyor is adapted to hold a succession of side-by-side packages, in combination with a plurality of package-pushers at the discharge end of the machine, and automatic means for operating said pushers, one after another, whereby the packages are discharged one at a time.

* * * * *